United States Patent Office 3,279,115
Patented Oct. 18, 1966

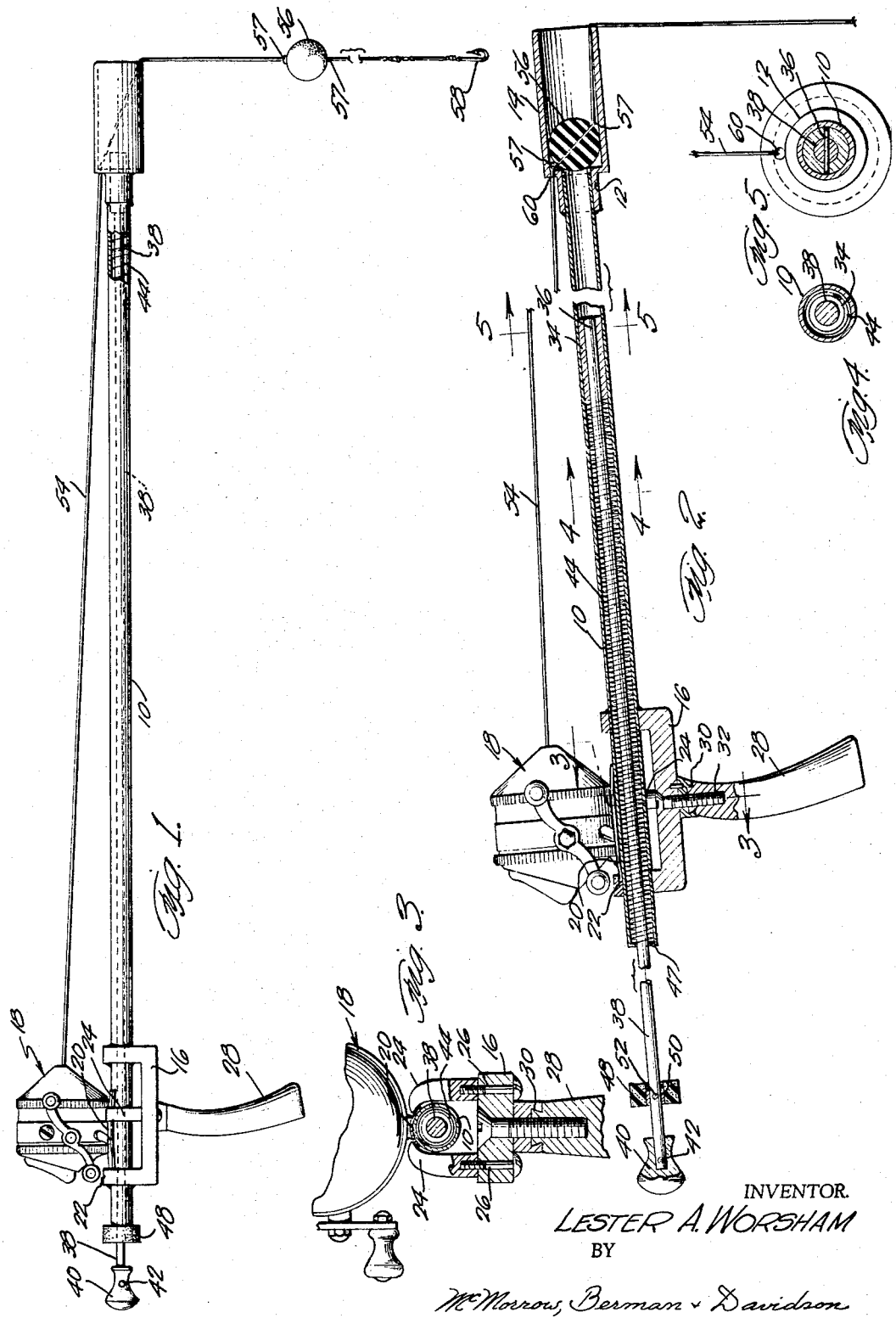

3,279,115
FISHING ROD
Lester A. Worsham, Box 559, Cedartown, Ga.
Filed Aug. 21, 1964, Ser. No. 391,198
2 Claims. (Cl. 43—19)

This invention relates to a fishing rod having self-contained means for projecting a fishing plug and attached line therefrom, in contrast to the conventional whip action of a fishing rod.

It is a general object of the invention to ease the task of casting bait or lures. Another object is to lessen the need for skill in casting, without sacrifice to distance or accuracy. Yet another object is to eliminate the need for relatively heavy casting weights, which improves the operation with live bait.

A still further object is to enable casting in close quarters, as among trees, or in a boat having a top. It is also an object to provide for the foregoing objects, while retaining the option of casting by conventional whip action.

It is also among the objects to provide for a device as aforesaid, which is simple in structure, yet durable, and reliable in action, and which is furthermore, easy of manufacture, and low in cost.

A preferred form of the invention is described in the following specification, and illustrated in the accompanying drawing, in which:

FIGURE 1 is a side elevational view, partly broken away, of a device in accordance with the invention, FIGURE 2 is a contracted axial, sectional view taken through FIGURE 1, showing the device in position, FIGURE 3 is a sectional view of a detail through the reel mount, taken on the plane of the line 3—3 of FIGURE 2, FIGURE 4 is a transverse, sectional view taken on the plane of the line 4—4 of FIGURE 2, and FIGURE 5 is a view similar to FIGURE 4, taken on the plane of the line 5—5 of FIGURE 2.

Referring to the drawing by characters of reference there is shown a tubular barrel 10, of uniform bore throughout, having affixed, at its outer end, an exterior sleeve 12, integral with a terminal, cup member 14, of somewhat larger bore than the barrel, and having a bottom opening coinciding with said bore. Fixed, through aligned bores, to barrel 10, near its rear end, as by welding, is a saddle, or yoke, 16, for mounting a reel, such as the conventional, closed, spinning reel 18 shown. The clamp plate 20 of the reel fits in an upper niche of one of the uprights 22, of the yoke, and a three-point clamping arrangement is completed by a pair of movable hooks 24, secured at the two sides of the central section of yoke 16 by screws 26. Also centrally of its length, the yoke carries a depending handle 28, secured by an upset, dovetail boss connection 30, and a screw 32.

A piston 34, slidably carried in barrel 10 is fixed by a pin 36 to forward end of a plunger rod 38, of somewhat less diameter, which normally extends, exteriorly of the rear end of barrel 10, and carries on its rear end a knob 40, secured by a pin 42, by means of which the rod 38 can be withdrawn, rearwardly of the barrel, to retract the piston 34. The plunger rod is normally biased in forward position in the barrel, by means of a compression, coil spring 44, surrounding the rod, and reacting, at its forward end, against the rear end of piston 34, and, at its rearward end, against a stop, which may be a separate plug, or a turned portion, or flange 47 of the barrel. The forward movement of the rod 38 is limited by a cylindrical, rubber collar 48, carried on a metal sleeve 50, secured to rod 38 by a pin 52, the collar being adapted to engage the stop 47 of the barrel. Preferably, in the forward position of the rod 38, the spring 44 is still more or less under compression.

The mass which carries a fishing line 54 in ballistic flight comprises a porous rubber sphere 56, threaded on and held in a selected position on the line 54 by stops 57, rearwardly of the outer end of the line bearing the hook 58. Line 54 enters cup 14 through a hole 60 in the bottom of the cup, and leaves through the full, front opening of the cup. Due to the very low amount of energy required for unreeling the line from the side-paying, spinning reel, the mass of the sponge rubber sphere 56, though relatively small, is ample to provide the momentum necessary to carry the line to the location desired. The sphere 56 is snugly slidable in, and is slightly oversize with respect to the bore of the cup 14 on the barrel, so as to be ejectable in response to the compressed air produced by a sudden movement forward of the piston 34 in the barrel 10. As seen in FIGURE 1, the collar 48 may be so set on the rod 38 that piston 34 is capable of moving into cup 14, so as to give a mechanical nudge to the sphere if it has not been dislodged from the cup by the column of compressed air.

As shown in the drawing, the device is operated by manually retracting the knob 40, aiming, and either releasing the knob for spring-induced forward movement of the piston 34, or by assisting this forward movement by a push on the knob.

While a certain, preferred embodiment has been shown and described, various modifications thereof will be apparent, in the light of this disclosure, and the invention should not, therefore, be deemed as limited, except insofar as shall appear from the spirit and scope of the appended claims.

What is claimed is:

1. A device of the character described, comprising a tubular barrel, a larger diameter tube carried axially on the front end of said barrel and having a line guiding aperture, a reel having a fishing line received by said line guiding aperture and carried by said barrel, a compressible and resilient ball larger in diameter than and engaged in said tube in sealing relation to said front end of said barrel and line guiding aperture, and secured to said line, a piston slidable in said barrel for compressing the air therein for expelling said ball from said tube, a plunger rod carried by said piston, and extending rearwardly from said barrel, an internal stop flange on the rear end of said barrel, a compression spring surrounding said rod, within said barrel, and compressed between the piston and said stop flange, and a handle on the rear end of the plunger rod for retracting the plunger rod against the resistance of the spring.

2. A device as in claim 1, said rod having a collar located between the handle and the rear end of the barrel, said collar being adapted to engage the rear end of the barrel for arresting the forward motion of the plunger rod.

References Cited by the Examiner
UNITED STATES PATENTS

| | | | |
|---|---|---|---|
| 1,054,916 | 3/1913 | Gray | 43—19 |
| 1,310,644 | 7/1919 | Austin | 124—14 |
| 2,305,176 | 12/1942 | Littman | 43—19 |
| 2,537,754 | 1/1951 | Hanshaw | 43—6 |
| 3,111,783 | 11/1963 | Dillin | 43—19 |

SAMUEL KOREN, Primary Examiner.

W. H. CAMP, Assistant Examiner.